United States Patent [19]

Hamazato et al.

[11] 4,360,709
[45] Nov. 23, 1982

[54] LOOP DETECTING CIRCUIT

[75] Inventors: Kazuo Hamazato, Tokyo; Junjiro Kitano; Tetsuo Takeshita, both of Yokohama, all of Japan

[73] Assignees: Hitachi, Ltd.; Nippon Telegraph & Telephone Public Corporation, both of Tokyo, Japan

[21] Appl. No.: 184,182

[22] Filed: Sep. 4, 1980

[30] Foreign Application Priority Data

Sep. 5, 1979 [JP] Japan .............................. 54-112806

[51] Int. Cl.³ ...................... H04M 3/22; H04B 3/46
[52] U.S. Cl. ............................................. 179/18 FA
[58] Field of Search ............. 179/18 F, 18 FA, 81 R, 179/84 R, 16 F

[56] References Cited

U.S. PATENT DOCUMENTS

| 3,622,709 | 11/1971 | Tjaden | 179/18 FA |
| 4,079,208 | 3/1978 | Rogers et al. | 179/18 FA |
| 4,099,032 | 7/1978 | Roge et al. | 179/18 FA |

Primary Examiner—Thomas A. Robinson
Attorney, Agent, or Firm—Antonelli, Terry & Wands

[57] ABSTRACT

A circuit for detecting a closed loop formed by actuation of a telephone set, the loop being indicative of a connection between the telephone set and an exchange through a ring line and a tip line. The detecting circuit comprises generators for generating first and second detection signals having amplitudes proportional to a ring line current and a tip line current respectively, a summing circuit for summing the detection signals and a comparator for comparing the outputs of the summing circuit and a reference value and delivering an output depending upon the result of comparison.

11 Claims, 5 Drawing Figures

F I G. 4
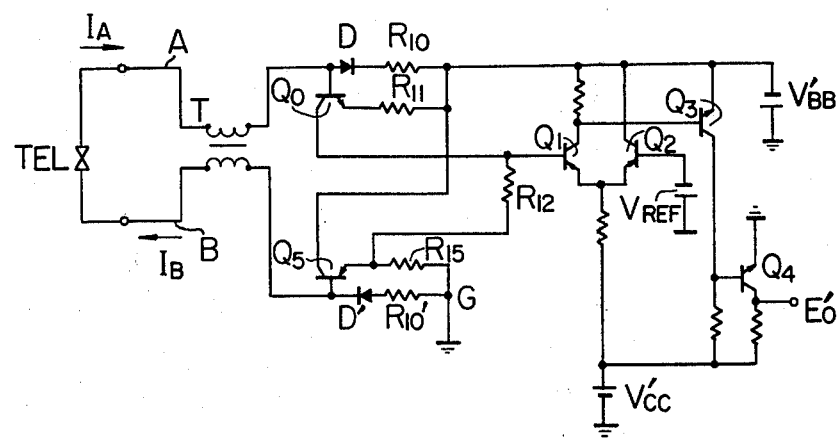
F I G. 5
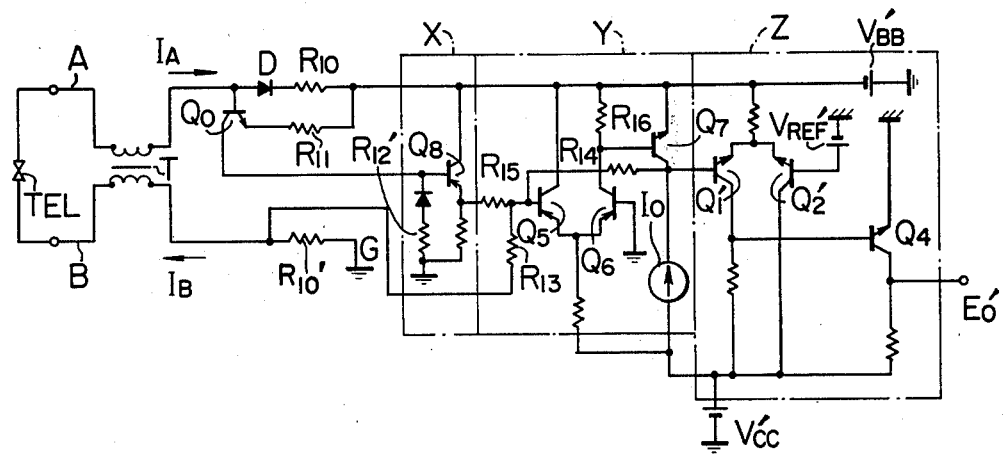

LOOP DETECTING CIRCUIT

This invention relates to loop detecting circuits used for subscriber circuits of telephone exchange systems or the like and, more particularly, to a loop detecting circuit which is suited for fabrication in a semiconductor integrated circuit form.

Presently, telephone exchange systems are in a trend of being implemented with electronics for size reduction, reliability increase and cost reduction. However, wide progress in the implementation with electronics has hitherto been achieved mainly for the control section of the system. For the subscriber circuit which is a direct interface for a subscriber end, however, the implementation with electronics, particularly the technique of fabrication in a semiconductor integrated circuit form, is lagging behind.

According to the present invention, there is provided a circuit for detecting a closed loop formed by actuation of a telephone set, the loop being indicative of a connection between the telephone set and an exchange through a ring line and a tip line, comprising: means for generating a first detection signal having an amplitude proportional to a ring line current flowing in the ring line; means for generating a second detection signal having an amplitude proportional to a tip line current flowing in the tip line, the ring line current and the tip line current flowing simultaneously in the closed loop; means for summing the first and second detection signals; and an output means responsive to the output of the summing means, the output means including a comparator and a reference signal source means, the outputs of the summing means and the reference signal source means being fed to the comparator.

In the drawings:

FIGS. 2 to 5 are circuit diagrams showing respective embodiments of the invention.

Figure 1:
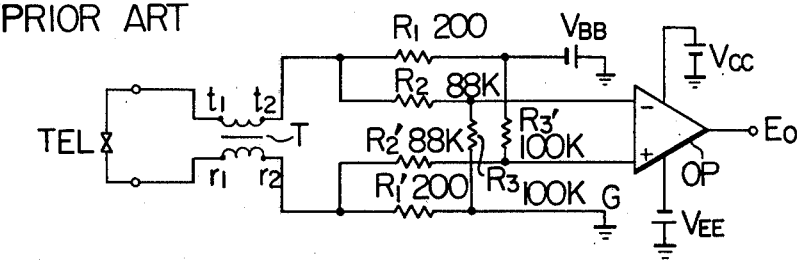
FIG. 1 is a circuit diagram showing an example of the loop detecting circuit in the prior art.

A prior art loop detecting circuit implemented with electronics will first be described with reference to FIG. 1. By the term "loop detecting circuit" is meant a circuit for detecting a current loop formed between the subscriber end and a telephone exchange. In FIG. 1, a telephone set TEL is shown with a first pair of terminals t1 and r1 of a transformer T connected across it. The transformer T has a second pair of terminals t2 and r2, with the terminal t2 connected through a resistor $R_1$ to the negative pole of a potential source $V_{BB}$ and the terminal r2 connected through a resistor $R_1'$ to a common potential line (i.e., ground) G. The positive pole of the potential source $V_{BB}$ is grounded. The potential source $V_{BB}$, resistor $R_1$, transformer T, resistor $R_1'$ and common potential line G form a current supply circuit for the telephone set TEL. Resistors $R_2$, $R_3$, $R_2'$ and $R_3'$ form a bridge circuit together with the afore-mentioned resistors $R_1$ and $R_1'$. The series circuit of the resistors $R_2$ and $R_3$ is connected at one end to the juncture between the terminal t2 of the transformer T and the resistor $R_1$ and is grounded at the other end. The series circuit of the resistors $R_3'$ and $R_2'$ is connected at one end to the juncture between the resistor $R_1$ and the potential source $V_{BB}$ and is connected at the other end to the juncture between the terminal r2 of the transformer T and the resistor $R_1'$. Designated at OP is an operational amplifier which is supplied with opposite polarity voltages of about 15 V from respective potential sources $V_{CC}$ and $V_{EE}$. The juncture between the resistors $R_2$ and $R_3$ is connected to an inverted input terminal of the operational amplifier OP, and the juncture between the resistors $R_3'$ and $R_2'$ is connected to a non-inverted input terminal of the amplifier. The bridge circuit $R_1$ to $R_3$ and $R_1'$ to $R_3'$ and the operational amplifier OP form the loop detecting circuit. The conductor from the telephone set TEL to the terminal t1 of the transformer T and the conductor from the telephone set TEL to the terminal r1 of the transformer T respectively constitute part of a ring line and part of a tip line.

The transformer T serves to prevent alternating current noise from being introduced into the loop detecting circuit from the telephone set side as well as other noise. The operational amplifier OP serves to compare its two inputs and produce a detection output signal based on the result of the comparison with a low output impedance.

When the handset of the telephone set TEL is picked up, a hook-switch in the telephone set TEL is turned on, whereby a current loop from the ground G through the resistor $R_1'$, terminals r2 and r1 of the transformer, telephone set TEL, terminals t1 and t2 of the transformer and resistor $R_1$ to the potential source $V_{BB}$ is formed to cause a loop current to flow. When the loop current is caused to flow, a potential difference which is sufficient to invert the output $E_0$ of the operational amplifier OP is produced between the input terminals thereof by the resistors $R_2$, $R_3$, $R_2'$ and $R_3'$. As a result, a loop detection signal is produced as the output $E_0$. In this loop detecting circuit of FIG. 1, however, the resistors $R_2$, $R_3$, $R_2'$ and $R_3'$ should offer highly precise high resistances of the order of 100 kΩ. The necessity of providing such highly precise high resistances is a serious obstruction to the formation of a semiconductor integrated circuit. In addition, since the operational amplifier OP is used, two separate potential sources $V_{CC}$ and $V_{EE}$ are required in addition to the potential source $V_{BB}$, which is very inconvenient.

Figure 2:
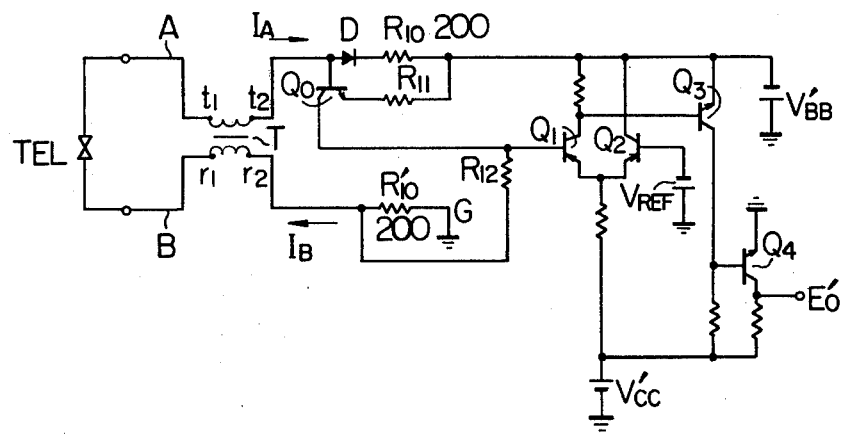

In FIG. 2 showing an embodiment of the invention, a first pair of terminals t1 and r1 of a transformer T are connected across a telephone set TEL as in the circuit of FIG. 1. A second pair of terminals t2 and r2 of the transformer T are respectively connected to the diode side end of a series circuit of a diode D and a resistor $R_{10}$ and to one end of a resistor $R_{10}'$. The resistor side end of the above series circuit is connected to the negative pole of a potential source $V_{BB}'$ which has its positive pole connected to a common potential line, for instance ground G. The other terminal of the resistor $R_{10}'$ is grounded. A current supply circuit for the telephone set TEL includes the common potential line G, resistor $R_{10}'$, transformer T, diode D, resistor $R_{10}$ and potential source $V_{BB}'$. This means that the telephone set TEL, which is a subscriber end, is connected to the current supply circuit of the exchange through a ring line A and a tip line B. In a loop detecting circuit, means for generating a first detection signal having a magnitude proportional to the current $I_A$ flowing through the ring line A includes a transistor $Q_0$ having the base thereof connected to the ring line A, a resistor $R_{11}$ having one end connected to the emitter of the transistor $Q_0$, the series circuit of the diode D and resistor $R_{10}$ and a resistor $R_{12}$ having one end connected to the collector of the transistor $Q_0$. The diode D has its anode connected to the base of the transistor $Q_0$ and its cathode connected to one end of the resistor $R_{10}$. The other end of the resistor $R_{11}$ is connected to the other end of the resistor $R_{10}$.

Means for generating a second generation signal having a magnitude proportional to the current $I_B$ flowing through the tip line B includes the resistor $R_{10}'$ which is connected at one end to the common potential line (i.e., ground) and at the other end to the tip line B. The non-grounded end of the resistor $R_{10}'$ is also connected to the other end of the resistor $R_{12}$.

At one end of the resistor $R_{12}$ which is connected to the collector of the transistor $Q_0$, a voltage is produced representing the sum of the first and second detection signals. Thus, this constitutes a means for summing the first and second detection signals.

The juncture between the collector of the transistor $Q_0$ and the resistor $R_{12}$ is connected to the base of a transistor $Q_1$, which has its collector connected through a resistor to the potential source $V_{BB}'$. The emitter of the transistor $Q_1$ and the emitter of a transistor $Q_2$, which has its collector connected to the negative pole of the potential source $V_{BB}'$, are commonly connected through a resistor to the positive pole of another potential source $V_{CC}'$ whose negative pole is connected with the common potential line (e.g., ground).

The transistors $Q_1$ and $Q_2$ constitute a comparator for comparing an input voltage corresponding to the sum of a voltage proportional to the ring line current $I_A$ and a voltage proportional to the tip line current $I_B$ and a reference voltage $V_{REF}$ (a negative voltage in this embodiment). The result of comparison is produced as a detector output $E_0'$ from an output stage including transistor $Q_3$ and $Q_4$.

When the handset of the telephone set TEL is picked up, a hook-switch (not shown) in the telephone set TEL is turned on, whereby a loop current is caused to flow from the ground G through the resistor $R_{10}'$, terminals r2 and r1 of the transformer T, tip line B, telephone set TEL, ring line A, terminals t1 and t2 of the transformer, diode D and resistor $R_{10}$ to the potential source $V_{BB}'$. As mentioned earlier, a circuit including the transistor $Q_0$, resistors $R_{11}$ and $R_{12}$ and series circuit of the diode D and resistor $R_{10}$ generates a voltage proportional to the ring line current with respect to the ground. Meanwhile, the resistor $R_{10}'$ generates a voltage proportional to the tip line current. Since the resistors $R_{12}$ and $R_{10}'$ are connected to each other, the sum of a voltage proportional to the ring line current and a voltage proportional to a tip line current is produced on the base of the transistor $Q_1$. The transistors $Q_1$ and $Q_2$, constituting a voltage comparator as mentioned earlier, provide such a voltage comparing operation that the transistor $Q_1$ is turned on when the base potential thereon becomes lower than the reference voltage $V_{REF}$. The transistors $Q_3$ and $Q_4$ form a circuit for converting the on-off output of the transistor $Q_1$ to a TTL (transistor-transistor-logic) level. It is necessary to set the base-emitter forward potential difference of the transistor $Q_0$ and the forward voltage drop across the diode D to be substantially equal to each other. It is assumed that the current loop is formed to cause the ring line current $I_A$ and tip line current $I_B$ to flow. The base potential $V_{BQ1}$ on the transistor $Q_1$ is known from the voltage drop across the resistor $R_{10}'$ and the voltage drop across the resistor $R_{12}$ in the following way. Assuming that the current amplification factors ($h_{FE}$) of the transistors $Q_0$ and $Q_1$ are sufficiently high, $$-V_{BQ1} \simeq \left( I_B + \frac{R_{10}}{R_{11}} I_A \right) \cdot R'_{10} + \left( \frac{R_{10}}{R_{11}} I_A \right) \cdot R_{12} \quad (1)$$

$$= \frac{R_{10}}{R_{11}} (R'_{10} + R_{12}) I_A + R'_{10} I_B$$

By selecting resistance values such that $R_{10} = R_{10}'$, $R_{11} = R_{12}$ and $R_{12} \gg R_{10}'$, $$-V_{BQ1} \simeq (I_A + I_B) \cdot R_{10} \quad (2)$$

that is, the base potential $-V_{BQ1}$ of the transistor $Q_1$ is substantially equal to a voltage proportional to the sum of the ring line current $I_A$ and tip line current $I_B$. Meanwhile, since the base potential of the transistor $Q_2$ is the reference potential $V_{REF}$, when $V_{BQ1} < V_{REF}$, that is, when $$I_A + I_B > \frac{-V_{REF}}{R_{10}},$$

the transistor $Q_1$ is turned on to render the transistors $Q_3$ and $Q_4$ conductive and non-conductive, respectively, so as to invert the loop detection output $E_0$. In this way, a loop formation is detected. While the resistances of the resistors $R_{11}$ and $R_{12}$ should be selected to be sufficiently high with respect to the resistances of the resistors $R_{10}$ and $R_{10}'$ as stated above, with $R_{10} = R_{10}' = 200\,\Omega$, for instance, $R_{11} = R_{12}$ may be 5 to 10 k$\Omega$. This resistance value readily permits the formation of a semiconductor integrated circuit. At this time, what has been a problem regarding the precision of the resistance in the prior art example has now been reduced to the relative precision (e.g., to make the resistance ratio be about 20 to 50), and this can be readily achieved with the semiconductor IC technology. In addition, only a 5-V potential source for TTL is needed to provide the voltage $V_{CC}'$, and the two 15-V potential sources $V_{CC}$ and $V_{EE}$ for the operational amplifier in the detecting circuit of FIG. 1 are no longer needed.

The reason why use is made of the sum of the currents flowing in the ring line and the tip line in the detection of the loop circuit formation is explained as follows. Generally speaking, a telephone set is connected with a telephone exchange system through a large number of kilometers of a telephone cable, which is often not sufficiently spaced from AC power lines or cables to prevent the flow of longitudinal inductive AC currents in the telephone cable. Namely, when such longitudinal currents are induced in the ring and tip lines through the telephone cable, the induced current flowing in the ring line and that flowing in the tip line are always in the same direction, i.e., both from the telephone TEL to the exchange or otherwise from the exchange to the telephone. This means that when the induced ring line current is increased the induced tip line current is decreased. As a result, if only either one of the ring line current and the tip line current is observed to determine whether a loop circuit is formed between the telephone set and the exchange, it is very likely to occur that even when a DC loop is not formed the detecting circuit may erroneously produce a loop detection output due to the induced current. It is apparent, therefore, that use of the sum of the ring line current $I_A$ and the tip line current $I_B$ in the detection of a current loop circuit formation will remove erroneous operation of the detecting circuit due to the induced longitudinal currents.

Figure 3:
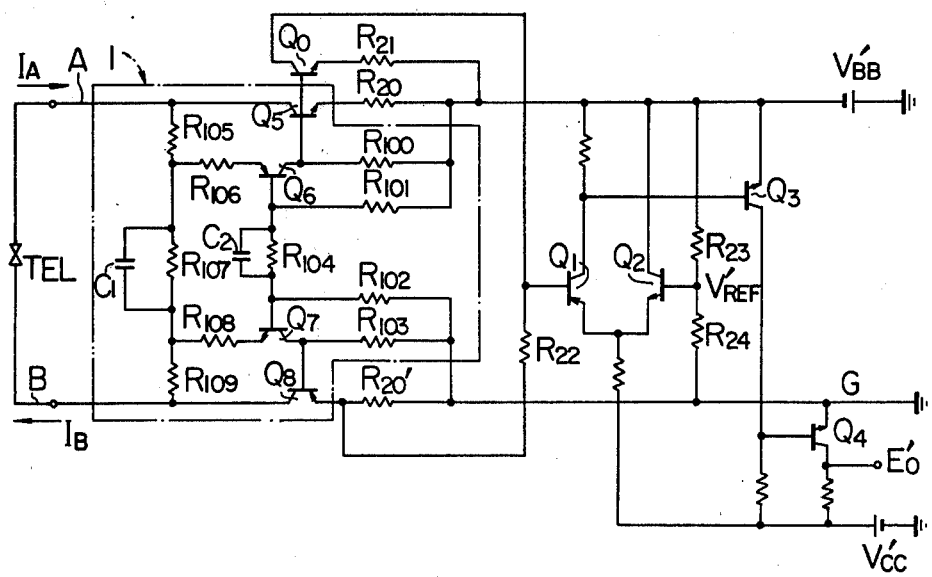

FIG. 3 shows another embodiment of the invention along with a current supply circuit implemented with electronics. This embodiment is a slight modification of the embodiment of FIG. 2. A circuit 1 enclosed in a broken line, including transistors $Q_5$, $Q_6$, $Q_7$ and $Q_8$, resistors $R_{100}$, $R_{101}$, $R_{102}$, $R_{103}$, $R_{104}$, $R_{105}$, $R_{106}$, $R_{107}$, $R_{108}$ and $R_{109}$ and capacitors $C_1$ and $C_2$, is an example of the realization of an electronic circuit having the same function as the transformer T in FIG. 2, and it constitutes part of a current supply circuit. This current supply circuit is disclosed in U.S. patent application No. 78,469 (filed Sept. 24, 1979), West German patent application No. P2938346 (filed Sept. 21, 1979) and Canadian patent application No. 336004 (filed Sept. 20, 1979), these applications all being based upon Japanese patent application No. 115766/1978 (laid open under Japanese patent application laid-open (KOKAI) No. 42449/80 on Mar. 25, 1980. Thus, this current supply circuit does not constitute the subject matter of the invention and will be described only briefly. The transistors $Q_5$ and $Q_6$, resistors $R_{20}$, $R_{100}$, $R_{101}$, $R_{104}$, $R_{105}$, $R_{106}$ and $R_{107}$ and capacitors $C_1$ and $C_2$ form a negative feedback circuit, and the transistors $Q_7$ and $Q_8$, resistors $R_{20}'$, $R_{103}$, $R_{102}$, $R_{104}$, $R_{107}$, $R_{108}$ and $R_{109}$ and capacitors $C_1$ and $C_2$ form another negative feedback circuit. Thus, the circuit 1, when looked at from the direction of the telephone TEL, has a DC internal resistance equal to the resistance of the resistors $R_1$ and $R_1'$ in FIG. 1 (or resistors $R_{10}$ and $R'_{10}$ in FIG. 2). Thus, from the alternating-current point of view, this circuit 1 acts to provide the same impedance as the transformer T.

Thus, in FIG. 3 a current substantially equal to the ring line current $I_A$ flows through the resistor $R_{20}$, and a current substantially equal to the tip line current $I_B$ flows through the resistor $R_{20}'$. In other words, the resistors $R_{20}$ and $R_{20}'$ have an equivalent function to that of the resistors $R_{10}$ and $R_{10}'$ in FIG. 1 as far as loop detection is concerned. The operation of this loop detecting circuit is, therefore, the same as in the case of the embodiment of FIG. 2, so it is not described any further. In this embodiment, however, the base-emitter path of the transistor $Q_1$ in the circuit 1 fulfils the function of the diode D in FIG. 2, so that the diode D is no longer needed due to the connection of the base of the transistor $Q_0$ to the base of the transistor $Q_5$. Further, the reference potential $V_{REF}'$ is provided from the potential source $V_{BB}'$ through a voltage divider (consisting of resistors $R_{23}$ and $R_{24}$), that is, there is no need of providing any separate reference potential source $V_{REF}$. Furthermore, for the potential source $V_{CC}'$ only a 5-V potential source for TTL is needed, and the potential sources $V_{CC}=15$ V and $V_{EE}=-15$ V for the operational amplifier required in FIG. 1 are unnecessary.

Of course in the embodiment of FIG. 2 and other embodiments, resistors arranged for dividing the potential of the source $V_{BB}'$ may be provided as the reference potential source $V_{REF}$ such as in the embodiment of FIG. 3.

FIG. 4 shows a further embodiment. This embodiment is different from the embodiment of FIG. 2 in that a transistor $Q_5$, a resistor $R_{15}$ and a diode D' are additionally provided so as to generate a voltage proportional to the tip line current $I_B$ at the emitter of the transistor $Q_5$. The resistor $R_{10}'$ is connected at one end to the common potential line (i.e., ground) G and at the other end to the anode of the diode D'. The cathode of the diode D' is connected to the base of the transistor $Q_5$ and also to the tip line B. The collector of the transistor $Q_5$ is connected to the negative pole of the potential source $V_{BB}'$. The resistor $R_{15}$ is an emitter resistor which is grounded at one end and connected at the other end to the emitter of the transistor $Q_1$ and the other end (not connected to the base of the transistor $Q_1$) of the resistor $R_{12}$. Since the transistor $Q_5$ is arranged in an emitter-follower configuration, its output impedance is low enough to assure that the voltage drop across the resistor $R_{10}'$ is practically free from the influence of the ring line current $I_A$, so that there appears across the emitter resistor $R_{15}$ of the transistor $Q_5$ a voltage proportional to the tip line current $I_B$. The forward voltage drop across the diode D' is set to be substantially equal to the base-emitter forward potential difference of the transistor $Q_5$.

With the above construction, a voltage proportional to the ring line current $I_A$ is produced across the resistor $R_{12}$, and a voltage proportional to the tip line current $I_B$ is produced across the emitter resistor $R_{15}$ of the transistor $Q_5$. Thus, a voltage corresponding to the sum of these voltages, i.e., the sum of voltages proportional to the respective tip line and ring line currents, is applied to the base of the transistor $Q_1$. In other words, the transistor $Q_5$, diode D' and resistors $R_{15}$ and $R_{12}$ function in combination to produce the sum of the voltage proportional to the ring line current $I_A$ and the voltage proportional to the tip line current $I_B$.

While in the embodiment of FIG. 2 the collector current of the transistor $Q_0$ produces some voltage drop across the resistor $R_{12}$ in addition to that across the resistor $R_{10}'$ to have slight adverse effect upon the voltage proportional to the tip line current that is produced on the resistor $R_{10}'$, in the circuit of FIG. 4 the collector current of the transistor $Q_0$ primarily flows through the collector-emitter path of the transistor $Q_5$ by virtue of the current amplification effect of the transistor $Q_5$. Therefore, the afore-mentioned adverse effect is eliminated. Thus, in the circuit of FIG. 4 the condition $R_{12} >> R_{10}'$ (where $R_{10}=R_{10}'$ and $R_{11}=R_{12}$) which is required in the circuit of FIG. 2 is not always necessary, thus providing higher freedom of design concerning circuit constants.

FIG. 5 shows a still further embodiment of the invention. This embodiment is different from the embodiment of FIG. 2 by virtue of the circuit portions enclosed in the dotted line blocks X, Y and Z. Thus, only these portions will be described. Block X indicates an emitter follower circuit and includes a transistor $Q_8$ having its base connected with the collector of the transistor $Q_0$ in the first detection signal generating means, its collector connected with the negative pole of the potential source $V'_{BB}$ and its emitter connected with the common potential source (e.g., ground). The base of the transistor $Q_8$ is also connected with the cathode of a diode whose anode is connected with one end of a resistor $R'_{12}$, the other end of the resistor $R'_{12}$ being grounded. Meanwhile, the block Y indicates a sum voltage generating circuit and includes a resistor $R_{15}$ having one end connected with the emitter of the transistor $Q_8$ in the emitter follower circuit X, a resistor $R_{13}$ having one end connected with the non-grounded end of the resistor $R'_{10}$ in the second detection signal generating means, a transistor $Q_5$ having its base connected with the other ends of the resistors $R_{13}$ and $R_{15}$ and its collector connected with the negative pole of the potential source $V'_{BB}$, a transistor $Q_6$ having its emitter connected with the emitter of the transistor $Q_5$ and with the positive pole of the potential source $V'_{CC}$ through a resistor, its base grounded and its collector connected with the negative pole of the potential source $V'_{BB}$ through a resistor $R_{16}$, a resistor $R_{14}$ connected between the base of the transistor $Q_5$ and the base of a transistor $Q'_1$ in the comparator, and a transistor $Q_7$ having its base connected with the collector of the transistor $Q_6$, its emitter connected with the negative pole of the potential source $V'_{BB}$ and its collector connected with the juncture of the resistor $R_{14}$ and the base of the transistor $Q'_1$. A constant current source $I_O$ is provided between the collector of the transistor $Q_7$ and the positive pole of the potential source $V'_{CC}$ to supply the transistor $Q_7$ with a bias current. The constant current source $I_O$ may be realized with any known circuit such as a current mirror circuit. The block Z indicates an output stage including a voltage comparator. The comparator includes the transistor $Q'_1$ having its collector connected through a resistor to the positive pole of the potential source $V'_{CC}$ and a transistor $Q'_2$ having its collector connected to the positive pole of the potential source $V'_{CC}$. A reference potential source $V'_{REF}$ has its positive pole connected with the base of the transistor $Q'_2$ and its negative pole grounded. The emitters of the transistors $Q'_1$ and $Q'_2$ are connected in common, through a resistor, with the negative pole of the potential source $V'_{BB}$ the positive pole of which is grounded. The collector of the transistor $Q'_1$ is connected with the base of a transistor $Q_4$ having its emitter grounded and its collector connected with the positive pole of the potential source $V'_{CC}$ through a resistor. The comparator in this embodiment operates in the same manner as the comparator in the embodiment of FIG. 2 except that the operation polarity is opposite. Namely, the transistor $Q'_1$ is turned on when its base potential becomes higher than the reference voltage $V'_{REF}$ to turn the transistor $Q_4$ on while in FIG. 2 it is when the base potential of the transistor $Q_1$ becomes lower than the reference voltage $V_{REF}$ that the transistor $Q_1$ is turned on.

The emitter follower circuit X produces, at the emitter of the transistor $Q_8$, a voltage ($V_{EQ8}$) proportional to the ring line current $I_A$ from the voltage drop across the resistor $R'_{12}$ with a low output impedance. The sum voltage generating circuit Y produces an inversion of a voltage proportional to the sum of the output voltage $V_{EQ8}$ and the voltage drop ($V_{R10'}$) across the resistor $R'_{10}$. Here, by selecting the resistance values such that $$R_{15} = R_{13} = \frac{1}{k} R_{14} \; (k > 1),$$

the collector voltage $V_{CQ7}$ of the transistor $Q_7$ being the output of the sum voltage generating circuit is expressed as: $V_{CQ7} = -k(V_{EQ8} + V_{R10'})$. Accordingly, as in the case of FIG. 2 circuit, the base voltage $V_{BQ1}$ of the transistor $Q_1$ being the input to the comparator is $$V_{BQ1} = V_{CQ7} \simeq k\left( \frac{R_{10}}{R_{11}} I_A \cdot R'_{12} + I_B \cdot R'_{10} \right) \quad (3)$$

when resistor values are such that $R_{10} = R_{10}'$ and $R_{11} = R_{12}'$, $$V_{BQ1} \simeq k(I_A + I_B) \cdot R_{10} \ldots \quad (4)$$

In operation, when $V_{BQ1} > V_{REF}$ the transistor $Q_1$ is turned on to render the transistor $Q_4$ non-conductive, whereby the state of the output $E'_O$ is inverted to indicate detection of a formation of the closed loop.

In this embodiment, the condition for determining the loop detection now includes the amplification factor "k" ($> 1$) as seen in equation (4), so that the freedom of design of the reference potential source $V_{REF}$ is advantageously increased.

As has been described in the foregoing, the loop detecting circuit according to the invention, in which it is not necessary to set highly precise high resistances, is well implemented in the form of a semiconductor integrated circuit. Also, it does not require comparatively high potential sources which are not usually provided in an IC device.

What we claim is:

1. A circuit for detecting a closed loop formed by actuation of a telephone set, the loop being indicative of a connection between the telephone set and an exchange through a ring line and a tip line, comprising:
    means for generating a first detection signal having an amplitude proportional to a ring line current flowing in said ring line;
    means for generating a second detection signal having an amplitude proportional to a tip line current flowing in said tip line, said ring line current and said tip line current flowing simultaneously in said closed loop;
    means for summing said first and second detection signals and generating the resulting sum signal with respect to a common potential; and
    an output means responsive to said sum signal from said summing means, said output means including a comparator and a reference signal source means, said sum signal and the output of said reference signal source means being fed to said comparator.

2. A circuit according to claim 1, in which said output means includes means to deliver an output signal with an amplitude having two distinct states depending upon the result of comparison in said comparator.

3. A circuit for detecting a closed loop formed by actuation of a telephone set, the loop being indicative of a connection between the telephone set and an exchange through a ring line and a tip line, comprising:
    means for generating a first detection signal having an amplitude proportional to a ring line current flowing in said ring line;
    means for generating a second detection signal having an amplitude proportional to a tip line current flowing in said tip line, said ring line current and said tip line current flowing simultaneously in said closed loop;
    means for summing said first and second detection signals; and
    an output means responsive to the output of said summing means, said output means including a comparator and a reference signal source means, the outputs of said summing means and said reference signal source means being fed to said comparator, wherein said first detection signal generating means includes:
    a transistor with its base connected with said ring line, a first resistor having one end connected with the emitter of said transistor, a series connection of a diode and a second resistor, the resistor side end of said series connection being connected with the other end of said first resistor as well as with a potential source while the diode side end of said series connection is connected with the base of said transistor, and a third resistor having one end connected with the collector of said transistor; and further wherein said second detection signal generating means includes:

a resistance means having one end connected with a common potential line and the other end connected with the other end of said third resistor as well as with said tip line.

4. A circuit according to claim 3, in which said summing means includes said third resistor having said one end connected with said comparator, and said resistance means includes a fourth resistor.

5. A circuit according to claim 1 or 2, in which:

said first detection signal generating means includes:

a transistor with its base connected with said ring line, a first resistor having one end connected with the emitter of said transistor, a series connection of a diode and a second resistor, the resistor side end of said series connection being connected with the other end of said first resistor as well as with a potential source while the diode side end of said series connection is connected with the base of said transistor, and a third resistor having one end connected with the collector of said transistor;

said second detection signal generating means includes:

another transistor with its base connected with said tip line and with its collector connected with a potential source, a fourth resistor having one end connected with the emitter of said another transistor, a series connection of another diode and a fifth resistor having its resistor side end connected with the other end of said fourth resistor as well as with a common potential line and its diode side end connected with the base of said another transistor; and said summing means includes:

said third resistor having the other end connected with the one end of said fourth resistor as well as with the emitter of said another transistor.

6. A circuit for detecting a closed loop formed by actuation of a telephone set, the loop being indicative of a connection between the telephone set and an exchange through a ring line and a tip line, comprising:

means for generating a first detection signal having an amplitude proportional to a ring line current flowing in said ring line;

means for generating a second detection signal having an amplitude proportional to a tip line current flowing in said tip line, said ring line current and said tip line current flowing simultaneously in said closed loop;

means for summing said first and second detection signals; and an output means responsive to the output of said summing means, said output means including a comparator and a reference signal source means, the outputs of said summing means and said reference signal source means being fed to said comparator, wherein said first detection signal generating means includes:

a first transistor with its base connected with said ring line, a first resistor having one end connected with the emitter of of said first transistor, a series connection of a diode and a second resistor, the resistor side end of said series connection being connected with the other end of said first resistor as well as with a potential source while the diode side end of said series connection is connected with the base of said first transistor, a third resistor having one end electrically connected with the collector of said first transistor, the other end of said third resistor being connected with a common potential line, and a second transistor in an emitter follower configuration having its base connected with the collector of said first transistor and in electrical connection with the other end of said third resistor; said second detection signal generating means includes:

a resistance means having one end connected with said common potential line and the other end connected with said tip line; and said summing means includes:

a fourth resistor having one end connected with the emitter of said second transistor, a fifth resistor having one end connected with the other end of said resistance means, a third transistor having its base connected with the other ends of said fourth and fifth resistors and its collector connected with said potential source, a fourth resistor having its base connected with said common potential line and its collector connected with said potential source through a sixth resistor, the emitters of said third and fourth transistors being in common connection to another potential source, a seventh resistor having one end connected with the base of said third transistor, and a fifth transistor having its base connected with the collector of said fourth transistor, its emitter connected with said first-mentioned potential source and its collector connected with the other end of said seventh resistor, the connection point of the collector of said fifth transistor and said seventh transistor delivering the output of said summing means.

7. A circuit for detecting a closed loop formed by actuation of a telephone set, the loop being indicative of a connection between the telephone set and an exchange through a ring line and a tip line, comprising:

means for generating a first voltage signal having an amplitude proportional to a ring line current flowing in said ring line;

means for generating a second voltage signal having an amplitude proportional to a tip line current flowing in said tip line;

means for summing said first and second voltage signals and generating the resulting sum signal with respect to a common potential; and a comparing means including a reference source means, said comparing means receiving said sum signal from said summing means and the output of said reference source means for delivering an output signal assuming two distinct states depending on the result of comparison in the comparing means.

8. A circuit for detecting a closed loop formed by actuation of a telephone set, the loop being indicative of a connection between the telephone set and an exchange through a ring line and a tip line, comprising:

a first transistor means having a base connected with said ring line, an emitter connected with one end of a first resistor and a collector connected with one end of a third resistor, the base of said first transistor means also being connected with one end of a diode, the other end of said diode being connected with one end of a second resistor, the other end of said second resistor being connected with the other end of said first resistor as well as with a potential source;

a resistance means having one end connected with a common potential line and the other end connected with the other end of said third resistor as well as with said tip line;

a comparator having an input terminal connected with the connection point of the collector of said first transistor means and said one end of said third resistor and having another input terminal connected with a reference potential source; and an output stage arranged to receive the output of said comparator for delivering an output signal assuming two distinct states in dependence on the output of said comparator.

9. A circuit for detecting a closed loop formed by actuation of a telephone set, the loop being indicative of a connection between the telephone set and an exchange through a ring line and a tip line, comprising:

a first transistor means having a base connected with a ring line, an emitter connected with one end of a first resistor and a collector connected with one end of a third resistor, the base of said first transistor means also being connected with one end of a diode, the other end of said diode being connected with one end of a second resistor, the other end of said second resistor being connected with the other end of said first resistor as well as with a potential source;

a series connection of another diode and a fifth resistor having its diode side end connected with said tip line and its resistor side end connected with a common potential line;

a second transistor means in an emitter follower configuration, one end of the emitter resistance of said second transistor means being connected with said common potential line while the other end of the emitter resistance of said second transistor means is connected with the other end of said third resistor as well as with the emitter of said second transistor means, the base of said second transistor means being connected with the diode side end of said series connection;

a comparator having an input terminal connected with the connection point of the collector of said first transistor means and said one end of said third transistor and having another input terminal connected with a reference potential source; and an output stage arranged to receive the output of said comparator for delivering an output signal assuming two distinct states in dependence on the output of said comparator.

10. A circuit for detecting a closed loop formed by actuation of a telephone set, the loop being indicative of a connection between the telephone set and an exchange through a ring line and a tip line and for cancelling out longitudinal inductive signals generated by interfering AC signals along a telephone cable connecting said telephone set to said exchange, comprising:

means for generating a first detection signal having an amplitude proportional to a ring line current flowing in said ring line;

means for generating a second detection signal having an amplitude proportional to a tip line current flowing in said tip line, said ring line current and said tip line current flowing simultaneously in said closed loop;

means for summing said first and second detection signals and generating the resulting sum signal with respect to a common potential to cancel out said longitudinal inductive signals; and an output means responsive to said sum signal from said summing means, said output means including a comparator and a reference signal source means, said sum signal and the output of said reference signal source means being fed to said comparator.

11. A circuit for detecting a closed loop formed by actuation of a telephone set, the loop being indicative of a connection between the telephone set and an exchange through a ring line and a tip line and for cancelling out longitudinal inductive signals generated by interfering AC signals along a telephone cable connecting said telephone set to said exchange, comprising:

means for generating a first voltage signal having an amplitude proportional to a ring line current flowing in said ring line;

means for generating a second voltage signal having an amplitude proportional to a tip line current flowing in said tip line;

means for summing said first and second voltage signals and generating the resulting sum signal with respect to a common potential to cancel out said longitudinal inductive signals; and a comparing means including a reference source means, said comparing means receiving said sum signal from said summing means and the output of said reference source means for delivering an output signal assuming two distinct states depending on the result of comparison in the comparing means.

* * * * *